Figure 1:
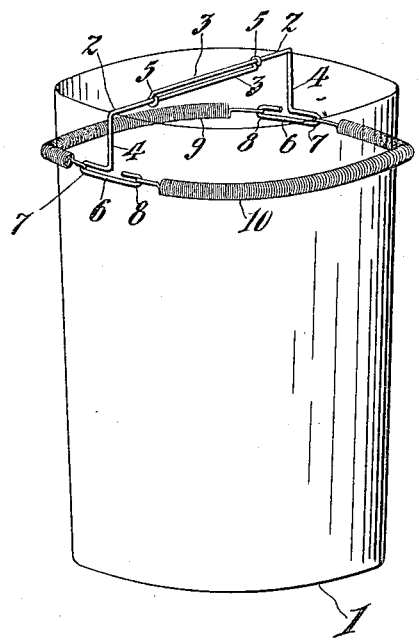

W. F. NEHR.
CLEANING DEVICE.
APPLICATION FILED MAY 23, 1916.

1,220,531.

Patented Mar. 27, 1917.

Witnesses:
H. Fisher
Frederick Bachmann

Inventor:
William F. Nehr
by William A. Hardy.
his Atty.

UNITED STATES PATENT OFFICE.

WILLIAM F. NEHR, OF WEST ORANGE, NEW JERSEY.

CLEANING DEVICE.

1,220,531.  Specification of Letters Patent.  Patented Mar. 27, 1917.

Application filed May 23, 1916.  Serial No. 99,269.

*To all whom it may concern:*

Be it known that I, WILLIAM F. NEHR, a citizen of the United States, and a resident of West Orange, Essex county, New Jersey, have invented certain new and useful Improvements in Cleaning Devices, of which the following is a description.

My invention relates to cleaning devices, and more especially to an improved cleaning device which is adapted to be applied to a pail, glass, jar or other receptacle containing material fluid or semi-fluid in character, such as paint, condensed milk, molasses, jam and the like, and which, when applied to the receptacle, may be utilized instead of the top edge of the latter for cleaning or scraping off surplus material from a brush, spoon or other implement employed in removing the material from the receptacle.

The principal object of my invention is to provide a device of this character which may be readily applied to and removed from receptacles or containers of different sizes, and which, when applied to a container, is firmly held thereon, preferably merely by the coaction of the device with the container, and presents stiff, firm means, preferably extending across the container, against which the spoon or other implement employed in removing material from the container may be scraped or wiped.

Another object of my invention is to so construct the cleaning device that the means extending across the container when the device is applied thereto, will be so disposed as to provide ample room for the insertion and removal of the spoon or other implement used for removing material from the container.

My invention also contemplates a device of this character which is very simple in construction and which may be cheaply manufactured.

Other objects of my invention reside in the combinations of elements and construction of parts hereinafter more specifically described and claimed.

Figure 2:
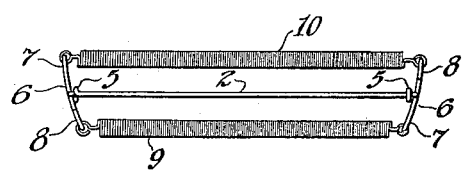

For a clearer understanding of my invention, attention is directed to the drawing accompanying and forming a part of this specification, and in which:

Figure 1 is a view in perspective showing a transparent receptacle having applied thereto a cleaning device constructed in accordance with my invention; and Fig. 2 is a plan view of the cleaning device removed from the receptacle.

Referring to the drawing, reference character 1 represents a container or receptacle to which my improved cleaning device is adapted to be applied, and which is shown as cylindrical in form and made of transparent material, such as glass. The cleaning device consists of two similar pieces 2 preferably formed of light stiff wire, and each of which is preferably bent to form a long straight arm 3 and a short arm 4 disposed substantially at right angles to each other. The arms 3 are adjustably and preferably slidably connected, as by means of eyes 5 formed on the ends thereof, and constitute a composite extensible bar or member. Each of the short arms 4 of pieces 2 is provided at its end with a portion 6 disposed at right angles thereto and to the arm 3 and comprising two opposed U-shaped sections 7 and 8. The portions 6 are preferably slightly curved so as to fit snugly against the outer surface of a container to which the cleaning device is applied. The U-shaped sections 7 and 8 of one piece 2 are respectively connected to the U-shaped sections 8 and 7 of the other piece 2 by resilient means preferably in the form of coiled springs 9 and 10. The springs 9 and 10 are under tension and constantly tend to maintain the parts of the cleaning device in the relative positions shown in Fig. 2, with the eye 5 of each piece 2 disposed at the bend between the long arm 3 and the short arm 4 of the other piece 2, and to oppose the elongation of the composite bar or member consisting of the arms 3. The members 2 comprise a U-shaped device having an extensible base composed of the arms 3 and legs consisting of arms 4. It will be obvious, however, that the springs 9 and 10 will permit the base of the device to be extended or elongated and the device to be readily applied to the top portion of the container 1, regardless of the diameter of the latter, in the position shown in Fig. 1. When the device is so applied to the container, the portions of arms 3 adjacent arms 4 engage the upper edge of the container, and the arms 4 and springs 9 and 10 engage and coact with the outer surface of the container to hold the device very firmly thereon. When the device is so positioned on the container 1, the composite bar or member consisting of arms 3 extends across the container as shown, and constitutes a comparatively stiff or rigid means against which a spoon or other implement employed in removing the material from the container may be scraped or wiped to remove surplus material therefrom. The surplus material thus wiped off from the spoon or other implement will not accumulate on the edge and sides of the receptacle, but will fall back into the receptacle on the mass of the material therein. Accordingly, my improved device results in greater cleanliness and a more economical use of the material in the container. The spring 10 is preferably somewhat longer than the spring 9, whereby, when the device is applied to the container, the composite member or bar consisting of arms 3, is maintained in a position extending across the container to one side of the center thereof, as clearly shown in Fig. 1. Accordingly, ample room is provided at one side of this composite member for the spoon or other implement employed in removing the material from the container.

The pieces 2 may be readily made and assembled in the form shown and described herein by simple bending operations, and the springs 9 and 10 may then be quickly attached thereto to form the complete device. Accordingly, it will be evident that my improved cleaning device may be very readily and cheaply manufactured in large quantities.

While I have specifically described the preferred embodiment of my invention, it is to be understood that numerous changes may be made in the form, size and arrangement of the parts thereof without any departure from the spirit of my invention and the scope of the appended claims.

Having now described my invention, what I claim as new and desire to protect by Letters Patent is as follows:—

1. A cleaning device for application to a container, comprising extensible means adapted to extend across the container, and means constantly opposing the extension of said extensible means and adapted to directly coact with the container to hold the device in position thereon.

2. A cleaning device for application to a container, comprising a member having a portion adapted to extend across the container, and a pair of unequal resilient devices connected to said member, said pair of devices, when the cleaning device is applied to the container, being adapted by reason of their being unequal and resilient to coact with the container to hold said portion in a position extending across the container to one side of the center thereof.

3. A cleaning device for application to a container, comprising extensible means adapted to extend across the container, and resilient means constantly opposing the extension of said extensible means and adapted to directly engage the container to hold the device in position thereon.

4. A cleaning device for application to a container, comprising an extensible member adapted to extend across the container, and means comprising a pair of springs each of which is connected at its opposite ends to said member for embracing the container and for holding the device in position thereon.

5. A cleaning device for application to a container, comprising an extensible member adapted to extend across the container, and means comprising a pair of springs of unequal strength, each connected at its opposite ends to said member, for embracing the container to hold the device in position thereon.

6. A cleaning device for application to a container, comprising extensible means adapted to extend across the container, and means connected with said extensible means and adapted to embrace and coact with the container to hold the device in position thereon.

7. A device of the character described, comprising a pair of members each consisting of a pair of angularly disposed arms, one arm of each member being adjustably connected with the corresponding arm of the other member, and a pair of resilient members each of which is connected at its ends respectively to the other arms of said members.

8. A cleaning device for application to a container, comprising an extensible member adapted to extend across the container, and resilient means connected to the ends of said member and adapted to embrace the container to hold the device in position thereon.

9. A cleaning device for application to a container, comprising an extensible member adapted to extend across the container, and means adapted to embrace the container to hold the device in position thereon, comprising a pair of unequal resilient elements each secured at its ends respectively to said member.

10. A cleaning device for application to a container, comprising a U-shaped member having a base which is adjustable to vary the distance between its ends, and a pair of unequal resilient elements each connected at its ends respectively to the legs of said member.

11. A cleaning device for application to a container, comprising a member which is adjustable to vary the distance between its ends, and means for opposing such adjustment of said member as acts to increase the distance between its ends and for holding the device in position on the container.

12. A cleaning device for application to a container, comprising a member which is adjustable to vary the distance between its ends, and a pair or resilient elements each connected at its ends respectively to the ends of said member.

13. A cleaning device for application to a container, comprising a member adapted to extend across the container, and means for holding the device in position on the container comprising a pair of unqual resilient elements each connected at its ends respectively to said member.

This specification signed and witnessed this 20th day of May, 1916.

WILLIAM F. NEHR.

Witnesses:
FREDERICK BACHMANN,
J. UNGER.

Copies of this patent may be obtained for five cents each, by addressing the "Commissioner of Patents, Washington, D. C."